(12) United States Patent
Matsuura et al.

(10) Patent No.: US 6,642,930 B1
(45) Date of Patent: Nov. 4, 2003

(54) IMAGE PROCESSING APPARATUS, METHOD AND COMPUTER-READABLE MEMORY

(75) Inventors: Takahiro Matsuura, Yokohama (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/502,208

(22) Filed: Feb. 11, 2000

(30) Foreign Application Priority Data

Feb. 15, 1999 (JP) .......................................... 11-036513

(51) Int. Cl.[7] ................................................ G09G 5/02
(52) U.S. Cl. ...................... 345/601; 382/167; 382/168
(58) Field of Search ................................ 345/601, 546, 345/22; 358/522, 516; 382/167, 169, 168; 348/655

(56) References Cited

U.S. PATENT DOCUMENTS

| | | | | |
|---|---|---|---|---|
| 4,808,989 A | * | 2/1989 | Tabata et al. ................ | 345/601 |
| 4,899,216 A | * | 2/1990 | Tatsumi et al. .............. | 358/521 |
| 5,604,514 A | * | 2/1997 | Hancock ...................... | 345/604 |
| 5,748,773 A | | 5/1998 | Tashiro et al. .............. | 382/169 |
| 5,796,864 A | * | 8/1998 | Callahan ...................... | 382/166 |
| 5,894,300 A | * | 4/1999 | Takizawa ..................... | 345/545 |

* cited by examiner

Primary Examiner—Amelia M. Au
Assistant Examiner—Colin LaRose
(74) Attorney, Agent, or Firm—Fitzpatrick, Cella, Harper & Scinto

(57) ABSTRACT

On the basis of an image data of image data, an image discrimination unit discriminates whether the input image is a color image or an image having index data. The input image is corrected by an image correction unit based upon the results of discrimination.

8 Claims, 9 Drawing Sheets

FIG. 5

| ITEM | VALUE |
|---|---|
| HIGHLIGHT POINT (LH) OF IMAGE | ### |
| WHITE BALANCE RED (RH) | ### |
| WHITE BALANCE GREEN (GH) | ### |
| WHITE BALANCE BLUE (BH) | ### |
| HIGHLIGHT POINT (HP) AFTER CORRECTION | ### |
| HIGHLIGHT AREA | ##%~##% |
| SHADOW POINT (LS) OF IMAGE | ### |
| BLACK BALANCE RED (RS) | ### |
| BLACK BALANCE GREEN (GS) | ### |
| BLACK BALANCE BLUE (BS) | ### |
| SHADOW POINT (SP) AFTER CORRECTION | ### |
| SHADOW AREA | ##%~###% |

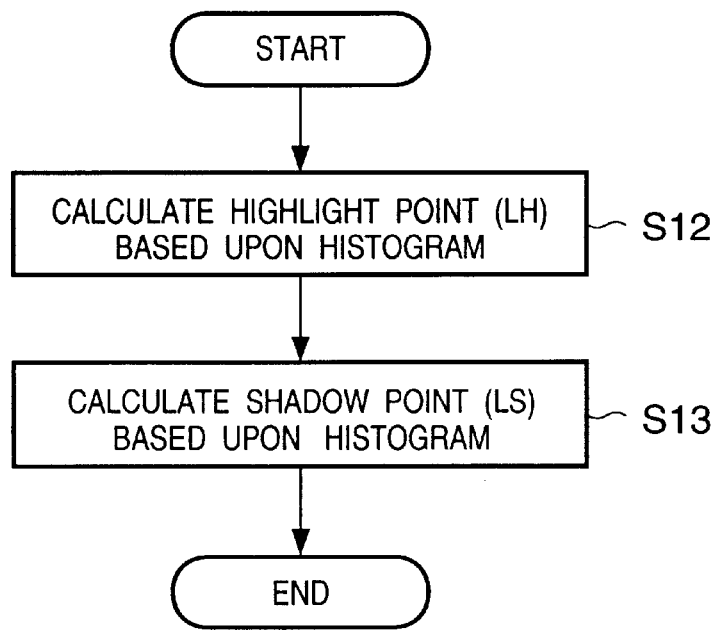
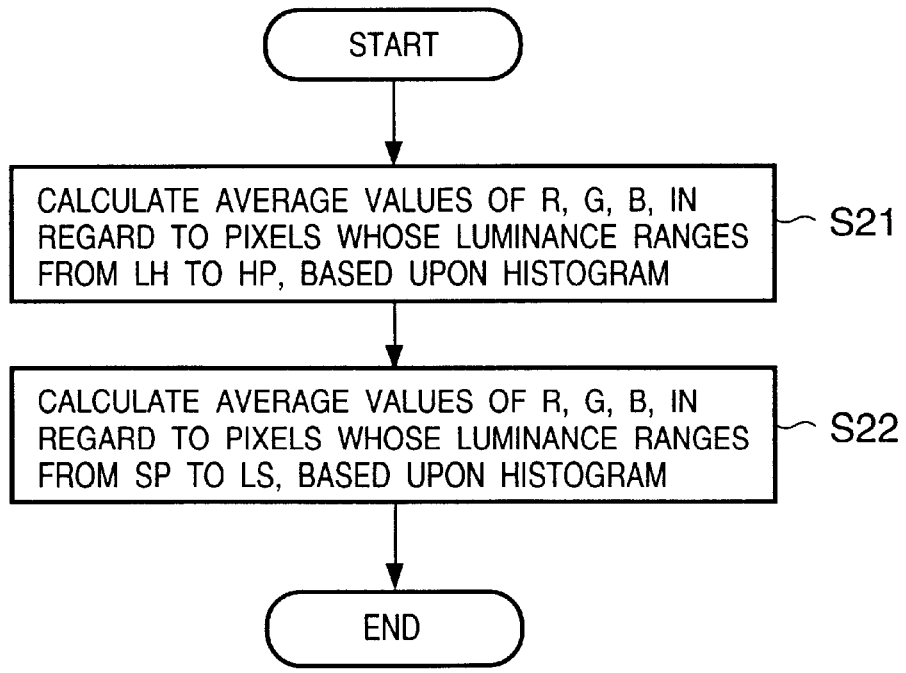

IMAGE PROCESSING APPARATUS, METHOD AND COMPUTER-READABLE MEMORY

FIELD OF THE INVENTION

This invention relates to an image processing apparatus and method for processing image data having index data, and to a computer-readable memory storing the program code for this processing.

BACKGROUND OF THE INVENTION

In an image processing apparatus for forming multivalued images, a white balance adjustment is performed for the purpose of obtaining an image having sharp contrast by adjusting the luminance values of highlight portions, which are the brightest portions of an image, and of shadow portions, which are the darkest portions of an image.

When a white balance adjustment is performed in a conventional image processing apparatus, the average values of R, G, B of pixels with the exception of pixels whose luminance is greater than a predetermined threshold value are calculated in a prescribed high-luminance area in which the luminance of the image ranges from the high luminance value to several percent of the high luminance value, and each pixel is corrected on the basis of each of the average values.

In the conventional image processing apparatus described above, however, processing can be applied only to a full-color image in which the R, G, B values are given for each and every pixel of the image data. As a consequence, processing cannot be executed in regard to an image having index data in which the image data itself is represented by index values.

SUMMARY OF THE INVENTION

Accordingly, an object of the present invention is to provide an image processing apparatus, method and computer-readable memory which make it possible to execute the processing of image data appropriately and at high speed in conformity with the content of the image data.

According to the present invention, the foregoing object is attained by providing an image processing apparatus for processing an image, comprising: discrimination means for discriminating, on the basis of an image header of an input image, whether the input image is an image having a plurality of color components or an image having index data; and correction means for correcting the input image based upon results of discrimination by the discrimination means.

According to another aspect of the present invention, the foregoing object is attained by providing an image processing apparatus for processing image data having index data, comprising: creating means for creating a histogram from the image data and its index data; highlight calculation means for calculating highlight-area information of the image data based upon the histogram; white-balance calculation means for calculating white-balance information of the image data based upon the histogram; and correction means for correcting the index data based upon the highlight-area information and white-balance information.

According to the present invention, the foregoing object is attained by providing an image processing method for processing an image, comprising: a discrimination step of discriminating, on the basis of an image header of an input image, whether the input image is an image having a plurality of color components or an image having index data; and a correction step of correcting the input image based upon results of discrimination at the discrimination step.

According to another aspect of the present invention, the foregoing object is attained by providing an image processing method for processing image data having index data, comprising: a creating step of creating a histogram from the image data and its index data; a highlight calculation step of calculating highlight-area information of the image data based upon the histogram; a white-balance calculation step of calculating white-balance information of the image data based upon the histogram; and a correction step of correcting the index data based upon the highlight-area information and white-balance information.

According to the present invention, the foregoing object is attained by providing a computer-readable memory storing program code of image processing for processing an image, the memory including: program code of a discrimination step of discriminating, on the basis of an image header of an input image, whether the input image is an image having a plurality of color components or an image having index data; and program code of a correction step of correcting the input image based upon results of discrimination at the discrimination step.

According to another aspect of the present invention, the foregoing object is attained by providing a computer-readable memory storing program code of image processing for processing image data having index data, comprising: program code of a creating step of creating a histogram from the image data and its index data; program code of a highlight calculation step of calculating highlight-area information of the image data based upon the histogram; program code of a white-balance calculation step of calculating white-balance information of the image data based upon the histogram; and program code of a correction step of correcting the index data based upon the highlight-area information and white-balance information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing an example of parameters held in parameter storage unit according to the first embodiment;

FIG. 6 is a flowchart illustrating the details of processing executed at step S4 in FIG. 2 according to the first embodiment;

FIG. 7 is a flowchart illustrating the details of processing executed at step S5 in FIG. 2 according to the first embodiment;

DESCRIPTION OF THE PREFERRED EMBODIMENTS

Embodiments of the present invention will now be described in detail with reference to the drawings.

First Embodiment

<Construction>

The construction of an image processing apparatus according to a first embodiment of the present invention will now be described with reference to FIG. 1.

Figure 1:
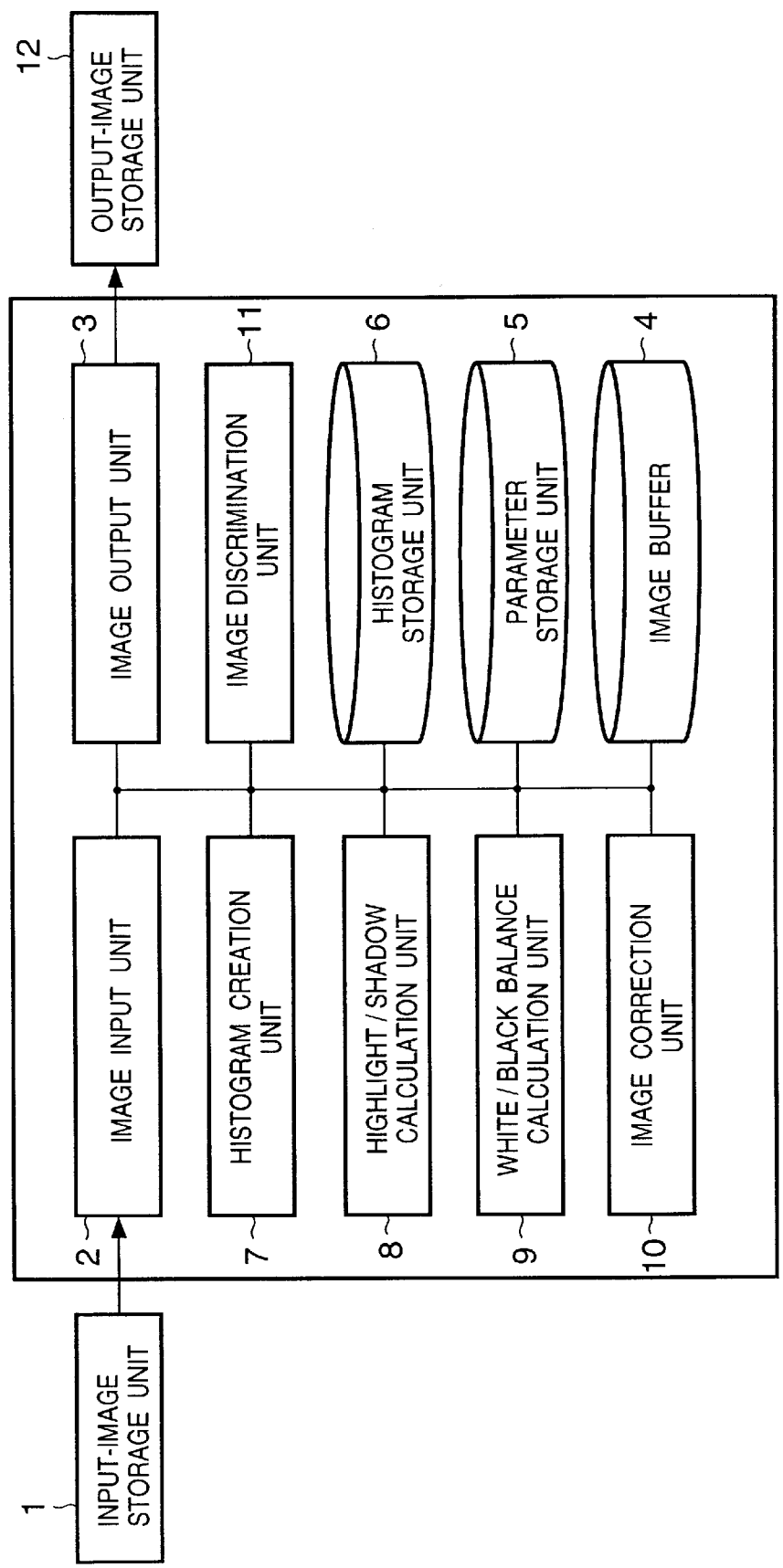
FIG. 1 a block diagram illustrating an image processing apparatus according to a first embodiment of the present invention.

FIG. 1 a block diagram illustrating an image processing apparatus according to a first embodiment of the present invention.

In the image processing apparatus of the first embodiment, image processing components for adjusting white balance include an image input unit 2, an image output unit 3, an image buffer 4, a parameter storage unit 5, a histogram storage unit 6, a histogram creation unit 7, a highlight/shadow calculation unit 8, a white/black balance calculation unit 9, an image correction unit 10 and an image discrimination unit 11.

The image input unit 2 reads in image data and an image header from an input-image storage unit 1 and writes the data and header to the image buffer 4. The image output unit 3 reads in the image data and image header from the image buffer 4 and writes the data and header to an output-image storage unit 12. The parameter storage unit 5 stores parameters necessary for a correction, which is described later. The histogram storage unit 6 stores a histogram of the image data.

On the basis of the image header stored in the image buffer 4, the image discrimination unit 11 determines whether the input image is a full-color image or image data having index data.

On the basis of the image data and image header that has been stored in the image buffer 4, the histogram creation unit 7 creates a histogram from the image data if the image discrimination unit 11 has determined that the input image is a full-color image, and from the image data and index data, the latter of which is contained in the image header, if the image discrimination unit 11 has determined that the input image is an image having index data. The histogram creation unit 7 stores the created histogram in the histogram storage unit 6. On the basis of the histogram that has been stored in the histogram storage unit 6, the highlight/shadow calculation unit 8 calculates highlight and shadow points and stores them in the parameter storage unit 5. The white/black balance calculation unit 9 calculates white and black balance and stores the results in the parameter storage unit 5.

On the basis of the data that has been stored in the parameter storage unit 5, the image correction unit 10 corrects the image data stored in the image buffer 4 if the image discrimination unit 11 has determined that the input image is a full-color image, and corrects the index data in the header stored in the image buffer 4 if the image discrimination unit 11 has determined that the input image is an image having index data.

<Image Correction Method>

An image correction method implemented in accordance with the first embodiment will be described with reference to FIG. 2.

Figure 2:
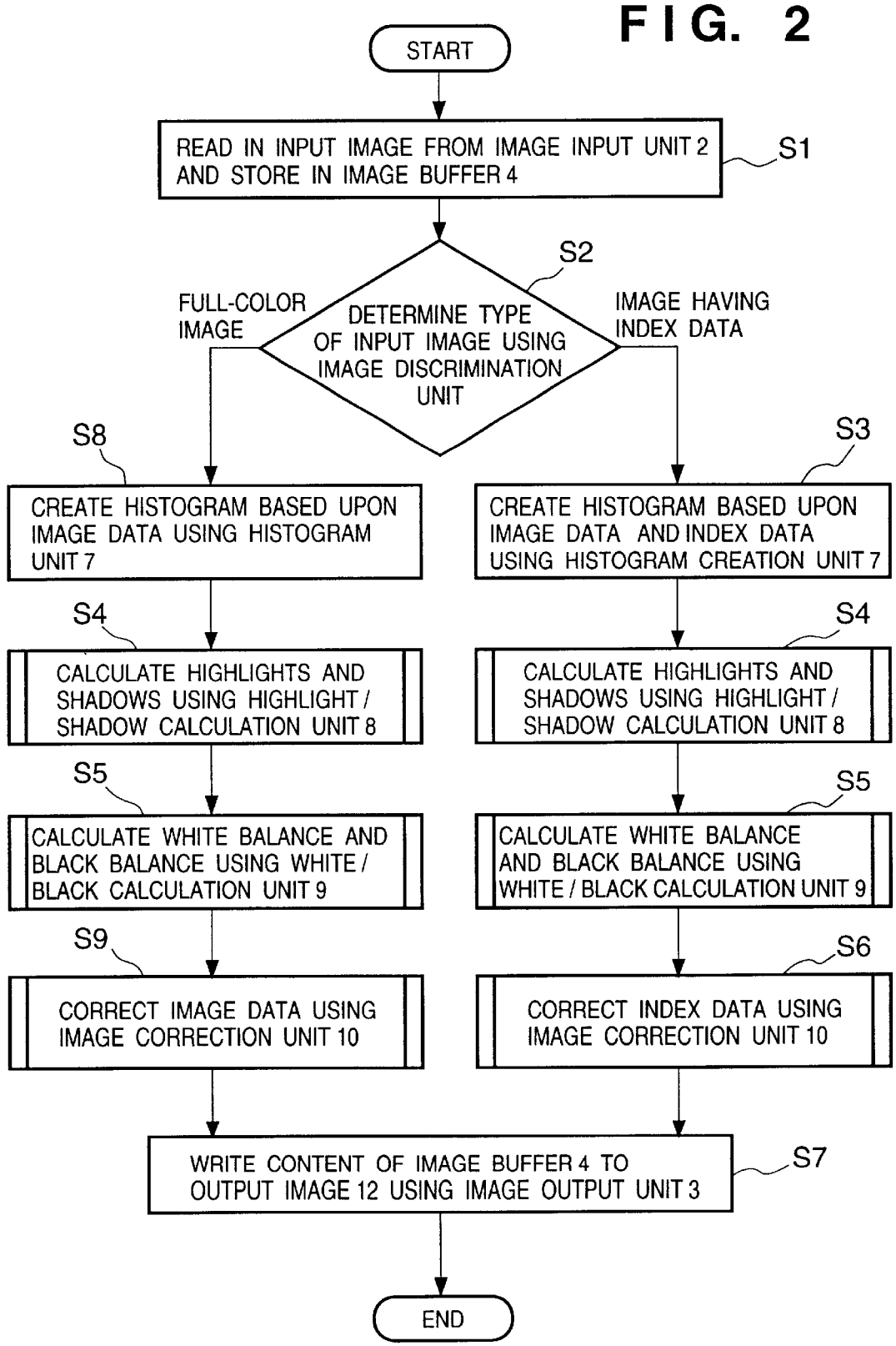
FIG. 2 is a flowchart illustrating an image correction method according to the first embodiment.

FIG. 2 is a flowchart illustrating an image correction method according to the first embodiment.

The image input unit 2 reads in image data and the image header from the input-image storage unit 1 and stores these in the image buffer 4 at step S1.

Next, at step S2, the image discrimination unit 11 determines, based upon the image header that has been stored in the image buffer 4, whether the input image is a full-color image or image data having index data. If the input image is discriminated as being a full-color image, control proceeds to step S8. If the input image is discriminated as being an image having index data, on the other hand, control proceeds to step S3.

Processing in a case where the input image is discriminated as being an image having index data is executed at steps S3 to S6, after which the processing of step S7 is executed.

Figure 3:
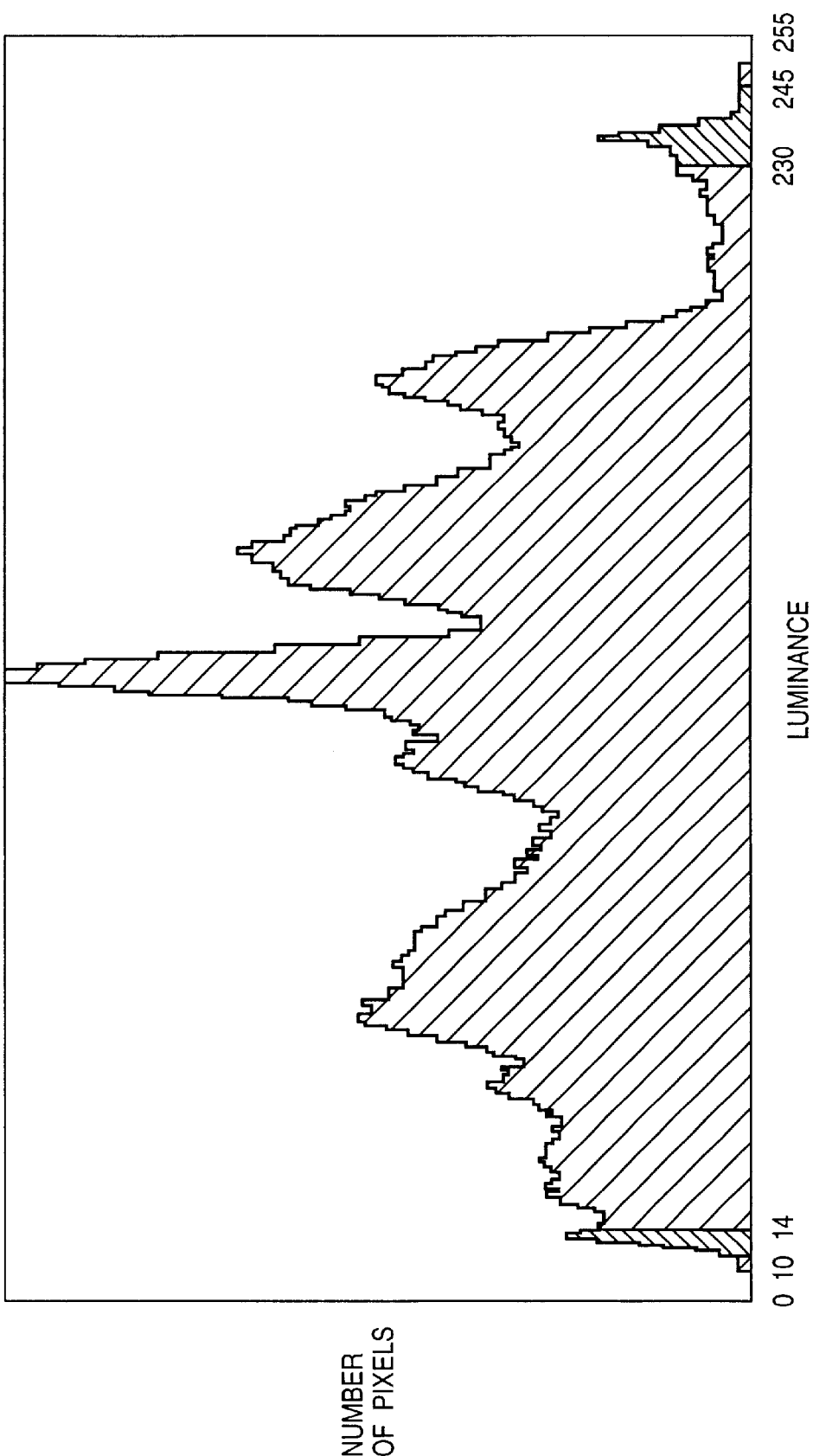
FIG. 3 is a diagram illustrating an example of a histogram crated by a histogram creation unit according to the first embodiment.

On the basis of the image data and index data stored in the image buffer 4, the histogram creation unit 7 creates a histogram and stores the created histogram in the histogram storage unit 6 at step S3. FIG. 3 illustrates an example of a histogram created by the histogram creation unit 7.

Next, at step S4, the highlight/shadow calculation unit 8 calculates highlight and shadow points of the image based upon the histogram stored in the histogram storage unit 6. The operation of the highlight/shadow calculation unit 8 will be described in detail later.

This is followed by step S5, at which the white/black balance calculation unit 9 calculates the white balance and black balance of the image data stored in the image buffer 4. The operation of the white/black balance calculation unit 9 will be described in detail later.

The image correction unit 10 reads in the index data from the image buffer 4, performs a correction for each item of index data and writes the results in the image buffer 4 again. The operation of the image correction unit 10 will be described in detail later.

The image output unit 3 outputs the image data and image header, which have been stored in the image buffer 4, by writing the data and header to the output-image storage unit 12 at step S7.

Processing in a case where the input image is discriminated as being a full-color image is executed at steps S8, S4, S5 and S9, after which the processing of step S7 is executed.

On the basis of the image data stored in the image buffer 4, the histogram creation unit 7 creates a histogram and stores the created histogram in the histogram storage unit 6 at step S8.

The above-described processing of steps S4, S5 is then executed.

The image correction unit 10 reads in the image data from the image buffer 4, performs a correction for each item of image data and writes the results in the image buffer 4 again. The operation of the image correction unit 10 will be described in detail later.

<Image Buffer 4>

The data (image data and image header) stored in the image buffer 4 will be described with reference to FIG. 4.

Figure 4:
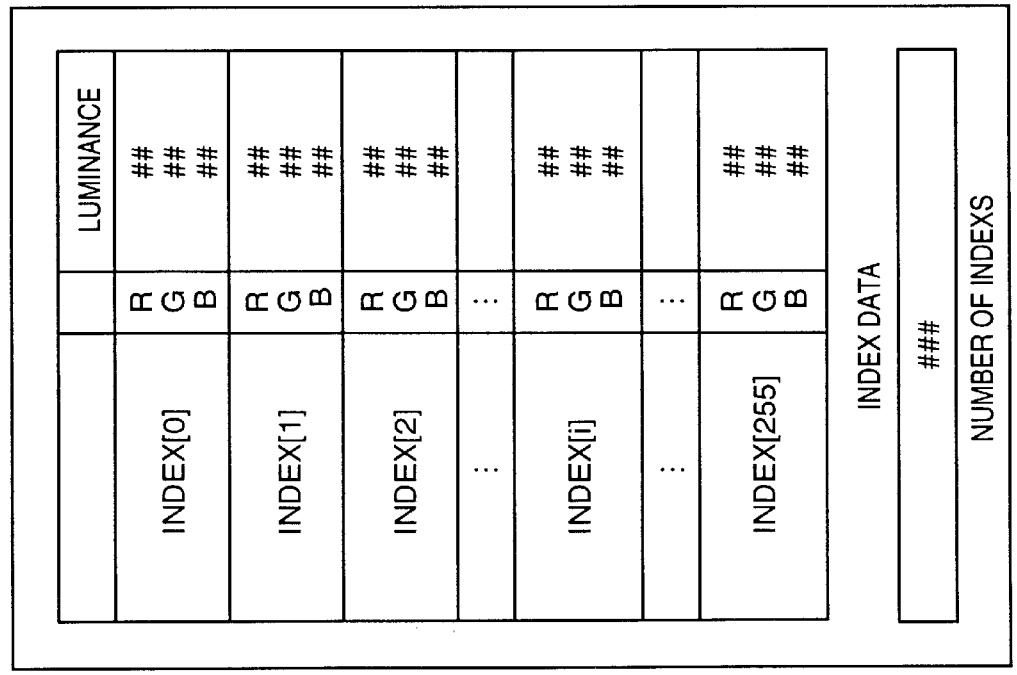
FIG. 4 is a diagram showing an example of data held in an image buffer according to the first embodiment.

In accordance with FIG. 4, the image header holds the number of items of index data and the index data itself.

The number of items of index data is zero in case of a full-color image.

The index data is represented by the following:

INDEX[i].R INDEX[i].G, INDEX[i].B where i denotes the index value, which is a whole number of from 0 to the maximum index value (255 in FIG. 4). Luminance of the index data, which is calculated based upon the luminance for each of R, G and B is stored in each item of index data. Nothing is stored here in the case of a full-color image. The luminance of the index data is calculated as follows:

$$L=(INDEX[IMG[n]]R\times 3+INDEX[IMG[n]]G\times 6+INDEX[IMG[n]]B\times 1)/(3+6+1)$$

where INDEX[IMG[n]]R represents the R component of n pixels having the luminance L, INDEX[IMG[n]]G the G component of n pixels having the luminance L, and INDEX[IMG[n]]B the B component of n pixels having the luminance L.

A histogram of the index data, which will be described later, is created upon referring to the luminance of each item of index data managed in individual units of the index data. As a result, the number of arithmetic operations for creating the histogram can be reduced as compared with the creation of a histogram of index data based upon the luminance of each of R, G, B constituting the index data. This makes it possible to raise processing speed.

The index value i of the index data is stored in image data IMG[n], where n is a whole number between zero and the total number of pixels.

<Parameter Storage Unit 5>

FIG. 5 is a diagram illustrating an example of parameters stored in the parameter storage unit 5 according to the first embodiment.

In accordance with FIG. 5, highlight and shadow points (LH, LS), white balance (RH, GH, BH), black balance (RS, GS, BS), adjusted highlight and shadow points (HP, SP), a highlight area and a shadow area are stored as parameters in order to perform the white-balance adjustment.

In the initial state, these parameters are initialized to suitable values. For example, 245 is set beforehand as the corrected highlight point (HP) and 10 is set beforehand as the corrected shadow point (SP). It should be noted that the highlight area is assumed to be one corresponding to 99–100% of the total number of pixels of the histogram, and that the highlight area is assumed to be one corresponding to 0–1% of the total number of pixels of the histogram.

<Histogram Creation Processing in Case of an Image Having Index Data>

The histogram storage unit 6 stores a histogram in relation to four components, namely the R, G, B components of the image data and the component of luminance L. Let these components be identified by HistR, HistG, HistB and HistL, respectively. A histogram is created in accordance with the following equations based upon the image data and index data stored in the image buffer 4:

when n satisfies the relation 0≦n≦(total number of pixels), we have $$HistR[L]=HistR[L]+INDEX[IMG[n]]R$$

$$HistG[L]=HistG[L]+INDEX[IMG[n]]G$$

$$HistB[L]=HistB[L]+INDEX[IMG[n]]B$$

$$HistL[L]=HistL[L]+1$$

From the results of calculation set forth above, histogram data contained in HistL[n] is as shown in, e.g., FIG. 3, described above. Further, HistR[L] is a histogram obtained by summing values of the R component for each luminance value, HistG[L] is a histogram obtained by summing values of the G component for each luminance value, and HistB[L] is a histogram obtained by summing values of the B component for each luminance value. Further, HistL[L] is a histogram obtained by counting the frequency of appearance of each luminance value.

<Histogram Creation Processing in Case of a Full-color Image>

The histogram storage unit 6 stores a histogram in relation to four components, namely the R, G, B components of the image data and the component of luminance L. Let these components be identified by HistR, HistG, HistB and HistL, respectively. A histogram is created in accordance with the following equations based upon the image data and index data stored in the image buffer 4:

when n satisfies the relation 0≦n≦(total number of pixels), we have $$HistR[L]=HistR[L]+IMG[n]]R$$

$$HistG[L]=HistG[L]+IMG[n]]G$$

$$HistB[L]=HistB[L]+IMG[n]]B$$

$$HistL[L]=HistL[L]+1$$

where L is taken as the luminance of the aforementioned pixels and is represented by $$L=(IMG[n]R\times 3+IMG[n]G\times 6+IMG[n]B\times 1)/(3+6+1)$$

From the results of calculation set forth above, histogram data contained in HistL[n] is as shown in, e.g., FIG. 3, described above. It should be noted that the initial values are all 0s.

More specifically, the index data shown in FIG. 4 is read out, the luminance L is obtained using the above-cited equations based upon the RGB luminance values of each of the index values, and a table is created by storing the values of luminance L in corresponding with the index values in the index data. The above-cited equations are then executed using the table and a histogram is created in regard to the four components, namely the R, G, B components of the image data and the component of luminance L.

Further, HistR[L] is a histogram obtained by summing values of the R component for each luminance value, HistG[L] is a histogram obtained by summing values of the G component for each luminance value, and HistB[L] is a histogram obtained by summing values of the B component for each luminance value. Further, IMG[n]R represents the R component of n pixels having the luminance L, IMG[n]G the G component of n pixels having the luminance L, and IMG[n]B the B component of n pixels having the luminance L. Further, HistL[L] is a histogram obtained by counting the frequency of appearance of each luminance value.

<Highlight/Shadow Calculation Processing>

Next, the processing executed by the highlight/shadow calculation unit 8, namely the details of processing executed at step S4 in FIG. 2, will be described with reference to FIG. 6.

FIG. 6 is a flowchart illustrating the details of processing executed at step S4 in FIG. 2 according to the first embodiment.

The highlight point (LH) of the image is calculated based upon the histogram HistL, which has been stored in the histogram storage unit 6, at step S11. Here LH represents the minimum luminance in the highlight area of the image. In the example of the histogram shown in FIG. 3, the range of luminance corresponding to the above-mentioned highlight area is 230 to 255, and therefore LH is 230. The result is stored in the parameter storage unit 5.

Next, at step S12, the shadow point (LS) of the image is calculated based upon the histogram created. Here LS represents the maximum luminance in the shadow area. In the example of the histogram shown in FIG. 3, the range of luminance corresponding to the above-mentioned shadow area is 0 to 14, and therefore LS is 14. The result is stored in the parameter storage unit 5.

<White/Black Balance Calculation Processing>

Next, the processing executed by the white/black balance calculation unit 9, namely the details of processing executed at step S5 in FIG. 2, will be described with reference to FIG. 7.

FIG. 7 is a flowchart illustrating the details of processing executed at step S5 in FIG. 2 according to the first embodiment.

White balance is calculated at step S21. More specifically, average luminances RH, GH, BH for each of R, G, B in an area in which luminance ranges from LH to HP are calculated in accordance with the equations shown below. In the example of the histogram shown in FIG. 3, the area in which luminance ranges from 230 to 245 is the area of interest. The average values obtained are stored in the parameter storage unit 5.

$$RH = \sum_{m=LH} HistR[m] / \sum_{m=LH} HistL[m]$$

$$GH = \sum_{m=LH} HistG[m] / \sum_{m=LH} HistL[m]$$

$$BH = \sum_{m=LH} HistB[m] / \sum_{m=LH} HistL[m]$$

Black balance is calculated at step S22. More specifically, average luminances RS, GS, BS for each of R, G, B in an area in which luminance ranges from SP to LS are calculated in accordance with the equations shown below. In the example of the histogram shown in FIG. 3, the area in which luminance ranges from 10 to 14 is the area of interest. The average values obtained are stored in the parameter storage unit 5.

$$RS = \sum_{m=SP} HistR[m] / \sum_{m=SP} HistL[m]$$

$$GS = \sum_{m=SP} HistF[m] / \sum_{m=SP} HistL[m]$$

$$BS = \sum_{m=SP} HistB[m] / \sum_{m=SP} HistL[m]$$

<Image Correction Processing in Case of an Image Having Index Data>

Next, the processing executed by the image correction unit 10 in a case where an image is one having index data, namely the details of processing executed at step S6 in FIG. 2, will be described with reference to FIG. 10.

Figure 8:
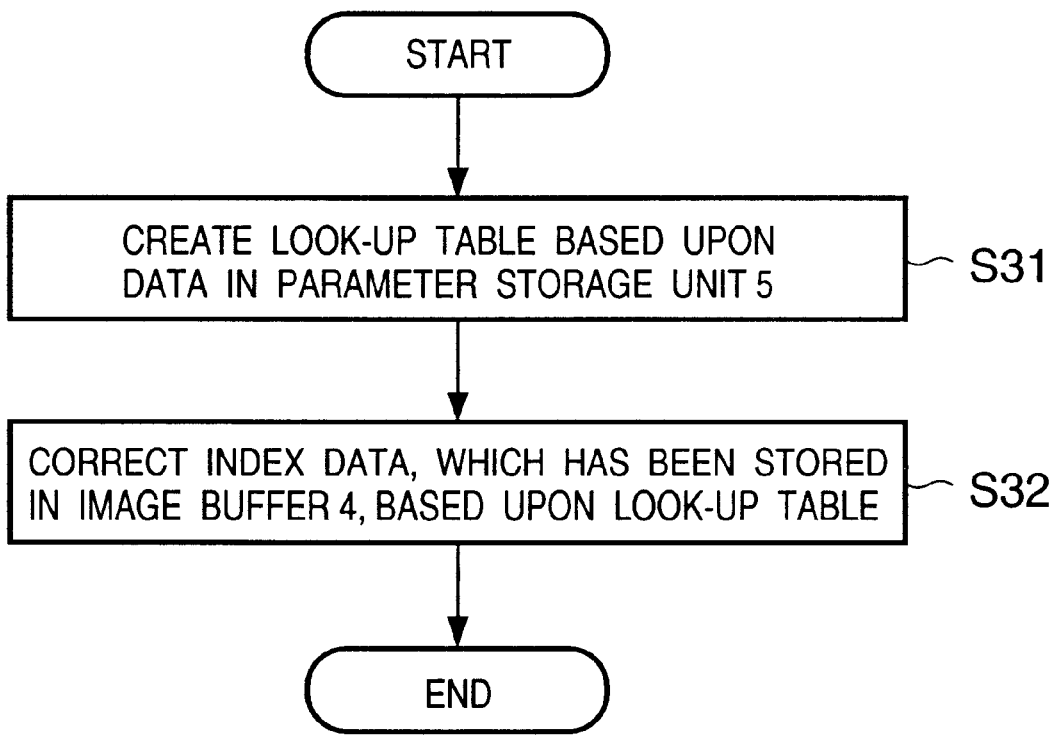
FIG. 8 is a flowchart illustrating the details of processing executed at step S6 in FIG. 2 according to the first embodiment.

FIG. 8 is a flowchart illustrating the details of processing executed at step S6 in FIG. 2 according to the first embodiment.

Figure 9:
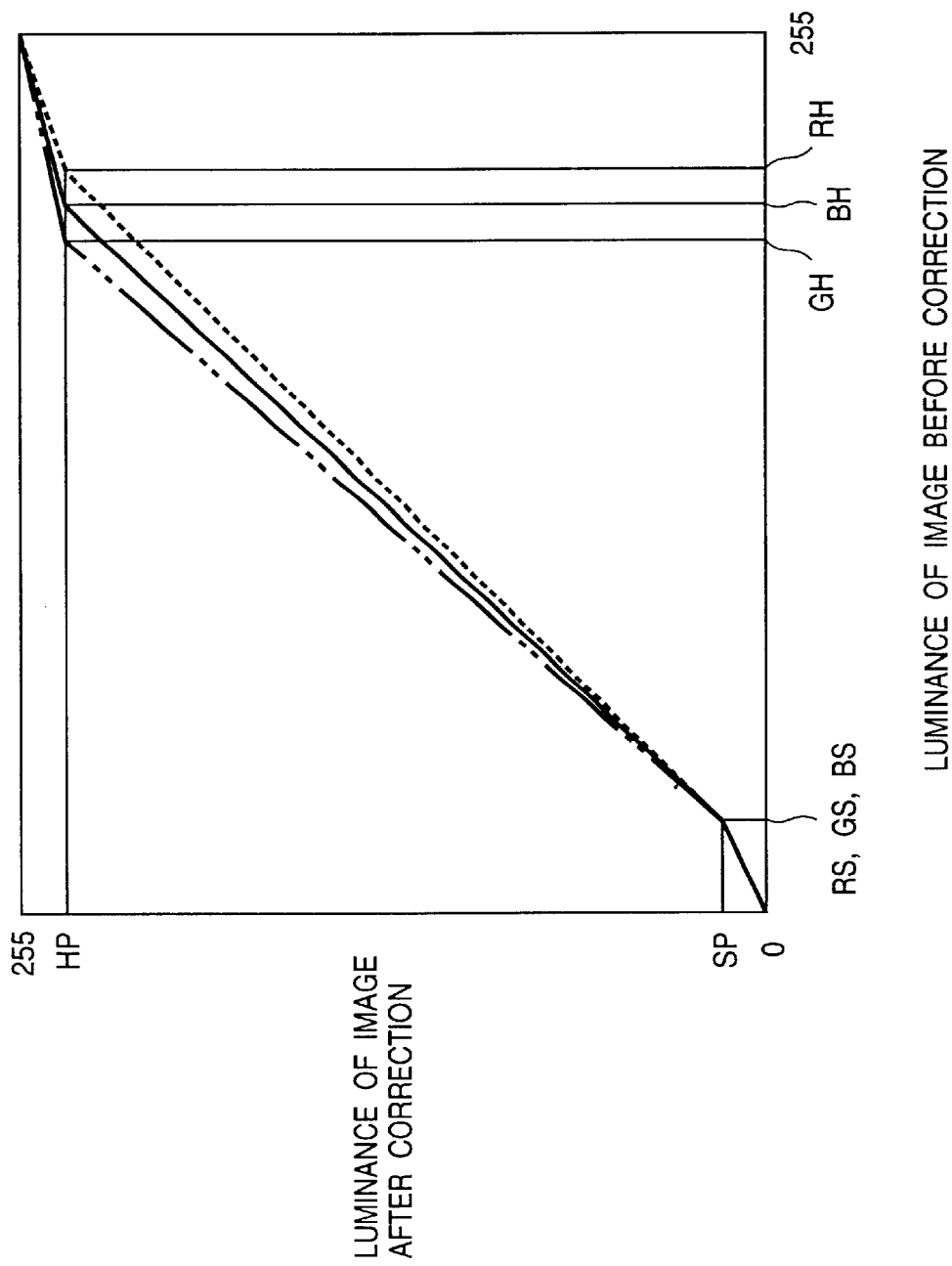
FIG. 9 is a diagram showing an example of a LUT according to the first embodiment.

A look-up table (LUT) is created at step S31 based upon RS, GS, GS, SP and RH, GH, BH, HP stored in the parameter storage unit 5. An example of the LUT is illustrated in FIG. 9. In the LUT shown in FIG. 9, highlight gamma appear in the order G, B, R. By thus intensifying G and B with respect to R, color fogging of an image having a bluish fog, for example, can be corrected.

Next, at step S32, the index data contained in the image header stored in the image buffer 4 is corrected one item at a time based upon the LUT created.

<Image Correction Processing in Case of a Full-color Image>

Next, the processing executed by the image correction unit 10 in a case where an image is a full-color image, namely the details of processing executed at step S9 in FIG. 2, will be described with reference to FIG. 10.

Figure 10:
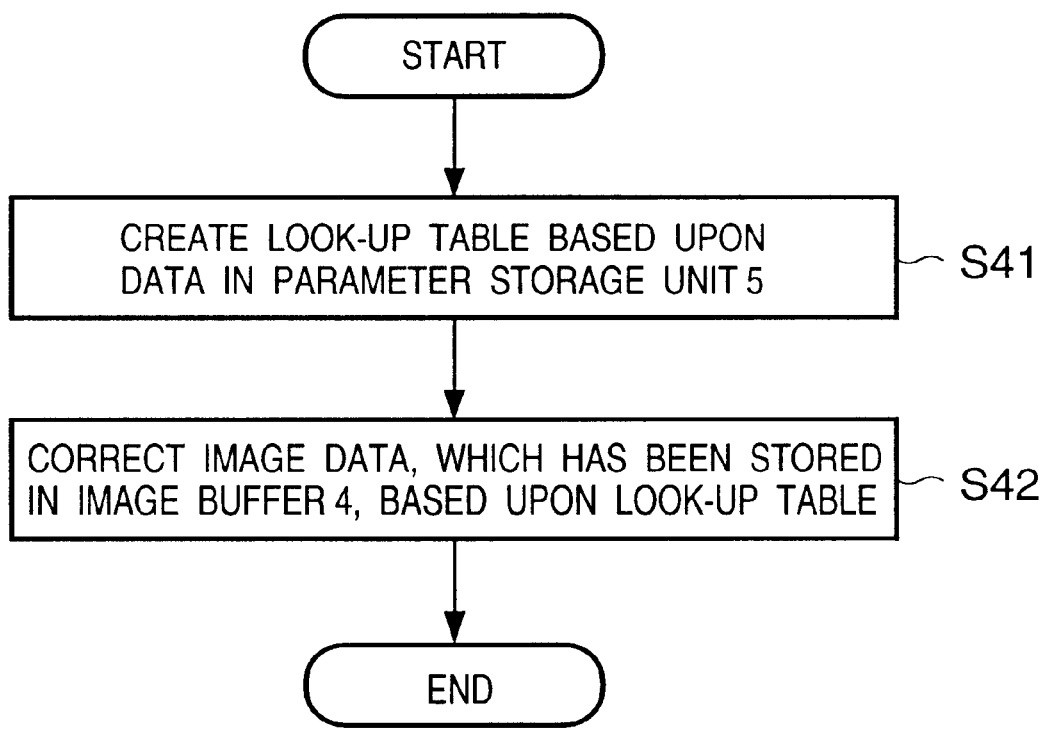
FIG. 10 is a flowchart illustrating the details of processing executed at step S9 in FIG. 2 according to the first embodiment.

FIG. 10 is a flowchart illustrating the details of processing executed at step S9 in FIG. 2 according to the first embodiment.

A look-up table (LUT) is created at step S41 based upon RS, GS, GS, SP and RH, GH, BH, HP stored in the parameter storage unit 5. An example of the LUT is illustrated in FIG. 9. In the LUT shown in FIG. 9, highlight gamma appear in the order G, B, R. By thus intensifying G and B with respect to R, color fogging of an image having a bluish fog, for example, can be corrected.

Next, at step S42, the image data contained in the image header stored in the image buffer 4 is corrected one item at a time based upon the LUT created.

Thus, in accordance with the first embodiment as described above, when a correction is performed, it is determined whether the input image is a full-color image or an image having index data, and the input image is then corrected based upon the results of determination. As a result, in a case where the input image is an image having index data, the correction is applied to the index data only and no correction whatsoever is applied in regard to this image data itself. Despite the amount of image data, therefore, processing for correcting the image data can be performed at high speed.

In the foregoing embodiment, luminance is represented by 256 levels of 0 to 255. It goes without saying, however, that the number of levels may be other than 256. Further, in regard to the index values as well, there are 256 levels from 0 to 255, though it is obvious that the number of levels may be other than 256. In addition, it goes without saying that index data is not limited to the luminance values of the colors R, G, B but be applied in the case of values of H, S, L and M, C, Y, K as well.

Second Embodiment

In the first embodiment, a white-balance adjustment is always performed in regard to an image having index data. However, though the white-balance adjustment is effective for pictorial images, it is not effective for application to graphic images having a small number of colors, such as in the case of graphs or the like. In such cases there are instances where it is better not to apply the correction. In a second embodiment of the invention, therefore, discrimination processing described below is executed at step S3 in FIG. 2 of the first embodiment.

More specifically, a characteristic of a graphic image for which the white-balance adjustment is not effective is the fact that the number of colors used in one image is small.

Accordingly, the number of luminance values for which pixels appear in the luminance histogram created at step S3 is counted. If the count is less than a predetermined value (e.g., 100), then the white-balance adjustment is not applied to the input image.

Further, at step S2, it is permissible to add on processing for discriminating whether the number of items of index data in the image header is not zero but less than a predetermined number. If the number of items of data is found to be less than the predetermined number, then the white-balance adjustment would not be applied to the input image.

According to the second embodiment, whether adjustment of white balance is carried out is determined in dependence upon the number of colors used in an image only in regard to an image having index data. By contrast, according to the present embodiment, whether adjustment of white balance is carried out is determined in dependence upon the number of colors even in regard to full-color image. This determination processing is carried out at step S8 and is similar to the processing executed at step S3 of the second embodiment.

According to the present embodiment, a predetermined value used in determining whether the white balance adjustment is performed or not is made different for an image having index data and for a full-color image. That is, based upon empirical values, the predetermined value of an image having index data is set to be smaller than the predetermined value of a full-color image.

Depending upon the application, a full-color image can be changed automatically to an image having index values. In a case where the change has been performed automatically, a problem arises if the index data is set without making appropriate accommodations for the colors used in the full-color image. Specifically, regardless of the fact that the number of colors of the original full-color image is greater than a predetermined value, processing for making the change to index data causes the number of colors to decline sharply and, as a consequence, to fall below the predetermined value.

Accordingly, in the present embodiment, the predetermined value of an image having index data is set to be smaller than the predetermined image of a full-color image, thereby making it possible to perform the above-mentioned determination in an appropriate manner.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function extension unit performs a part of or the entire process in accordance with the designation of program codes and implements the function of the above embodiment.

In a case where the present invention is applied to the above-mentioned storage medium, program code corresponding to the flowcharts (FIG. 2, FIGS. 6 to 8 and FIG. 10) described earlier would be stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for processing an image, comprising:

creation means for creating a histogram from an input image;

correction means for correcting the input image using a correction condition calculated based upon the histogram; and discrimination means for discriminating, on the basis of an image header of the input image, whether the input image is an image having a plurality of color components or an image having index data, wherein, in a case where the result of discrimination by said discrimination means is that the input image is an image having index data, said correction means creates a table by calculating values of luminance in correspondence with each of index values in the index data, and creates a histogram of the input image using the table, and said correction means corrects a plurality of color components in correspondence with the index data using the correction condition calculated based upon the histogram.

2. The apparatus according to claim 1, wherein said correction means includes:

highlight calculation means for calculating highlight-area information of the input image based upon said histogram; and white-balance calculation means for calculating white-balance information of the first input image based upon said histogram.

3. The apparatus according to claim 1, wherein, in a case where the input image is an image having index data, said discrimination means further discriminates whether the number of items of this index data is greater than a predetermined number, and wherein, in a case where the number of items of the index data is greater than the predetermined number, said correction means operates to perform correction, while in a case where the number of items of the index data is smaller than the predetermined number, said correction means does not perform correction.

4. An image processing method for processing an image, comprising the steps of:

creating a histogram from an input image;

correcting the input image using a correction condition calculated based upon the histogram; and discriminating, on the basis of an image header of the input image, whether the input image is an image having a plurality of color components or an image having index data, wherein, in a case where the result of discrimination obtained in said discrimination step is that the input image is an image having index data, said correction step includes creating a table by calculating values of luminance in correspondence with each of index values in the index data, and creating a histogram of the input image using the table, and said correction step includes correcting a plurality of color components in correspondence with the index data using the correction condition calculated based upon the histogram.

5. The method according to claim 4, wherein said correction step includes:

calculating highlight-area information of the input image based upon the histogram; and calculating white-balance information of the input image based upon the histogram.

6. The method according to claim 4, wherein, in a case where the input image is an image having index data, said discrimination step further includes discriminating whether the number of items of this index data is greater than a predetermined number, and wherein, in a case where the number of items of the index data is greater than the predetermined number, said correction step is performed, while in a case where the number of items of the index data is smaller than the predetermined number, said correction step is not performed.

7. A computer-readable memory storing program code of image processing for processing an image, the memory including:

program code of a creation step, of creating a histogram from an input image;

program code of a correction step, of correcting the input image using a correction condition calculated based upon the histogram; and program code of a discrimination step, of discriminating, on the basis of an image header of the input image, whether the input image is an image having a plurality of color components or an image having index data, wherein, in a case where the result of discrimination obtained in said discrimination step is that the input image is an image having index data, said correction step includes creating a table by calculating values of luminance in correspondence with each of index values in the index data, and creating a histogram of the input image using the table, and said correction step includes correcting a plurality of color components in correspondence with the index data using the correction condition calculated based upon the histogram.

8. An image processing apparatus for processing an image, comprising:

a creation unit, adapted to create a histogram from an input image;

a correction unit, adapted to correct the input image using a correction condition calculated based upon the histogram; and a discrimination unit, adapted to discriminate, on the basis of an image header of the input image, whether the input image is an image having a plurality of color components or an image having index data, wherein in a case where the result of discrimination by said discrimination unit is that the input image is an image having index data, said correction unit creates a table by calculating values of luminance in correspondence with each of index values in the index data, and creates a histogram of the input image using the table, and said correction unit corrects a plurality of color components in corresponding with the index data using the correction condition calculated based upon the histogram.

\* \* \* \* \*